Inventors
ROBERT O. TEEG &
ROBERT W. HALLMAN
By Bower & Patalidis
Attorneys

United States Patent Office 3,365,577
Patented Jan. 23, 1968

3,365,577
INFRARED IMAGING DEVICE UTILIZING A
VANADIUM DIOXIDE FILM
Robert O. Teeg, Grosse Pointe, and Robert W. Hallman, St. Clair Shores, Mich., assignors, by mesne assignments, to Teeg Research, Inc., Detroit, Mich., a corporation of Delaware
Filed July 1, 1964, Ser. No. 379,610
2 Claims. (Cl. 250—83.3)

ABSTRACT OF THE DISCLOSURE

Devices providing visible images of objects emitting radiant energy by projecting such radiant energy upon a film of thermochromic material exhibiting a change of coloration when heated beyond a transition temperature. The thermochromic film is maintained at a temperature just below the transition temperature such that the portions of the film of material upon which the radiation energy waves impinge are heated beyond the transition temperature, thus displaying a visually observable image of the object.

---

This invention relates generally to image detectors and more particularly to invisible radiation imaging devices.

The invention has particular utility in infrared detectors or imaging devices for accurately locating and viewing an invisible hot body. Consequently the invention is useful in connection with apparatus such as night time battlefield viewers, aircraft landing guidance systems, satellite or missile tracking, target acquisition, submarine tracking, spacecraft attitude control systems, to cite only a few applications. The invention is also useful in astronomy, medical testing, inspection of materials, detection of hot spots or hot elements in mechanical or electrical assemblies, etc. In its more general applications, the invention is capable of providing detectors or imaging devices for any type of radiant energy causing a temperature increase of a surface on which the energy is focused. It is, therefore, an object of the invention to provide novel invisible radiation detectors and imaging devices.

It is another object of the invention to provide radiation detectors capable of transforming an invisible image into a visible image which may be directly viewed by an observer, or which may be photographed.

It is still a further object of the invention to provide invisible radiation imaging devices which are economical to manufacture, which lend themselves to mass production techniques, which are sturdy and rugged so as to be usable in the field under adverse conditions, which are independent from any external source of power, the sensitivity of which may be easily and precisely adjusted and which may be accurately calibrated and compensated for aging of the active element.

Figure 1:
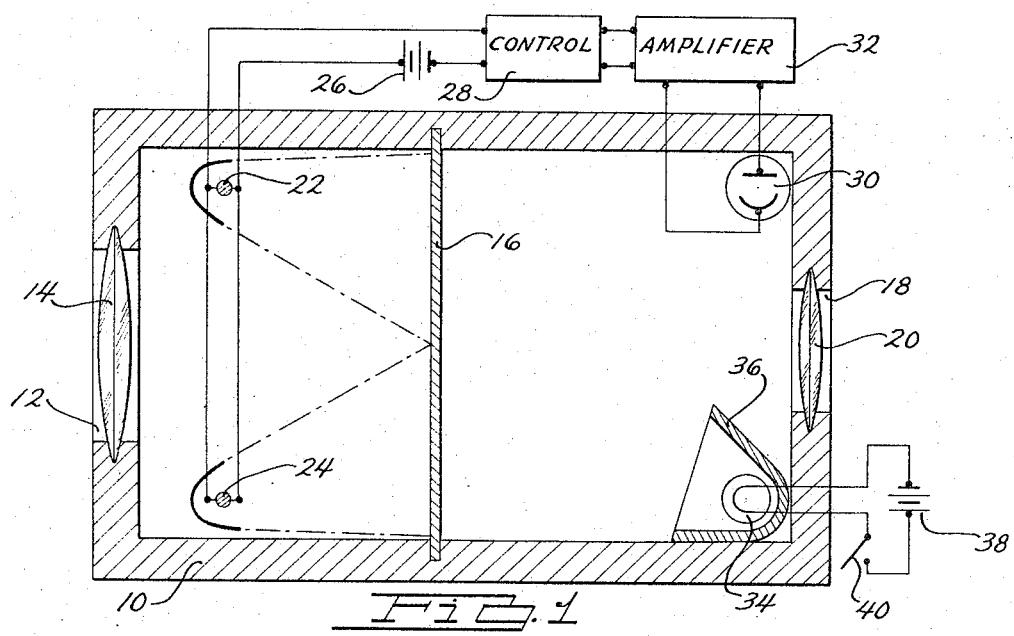
Figure 2:
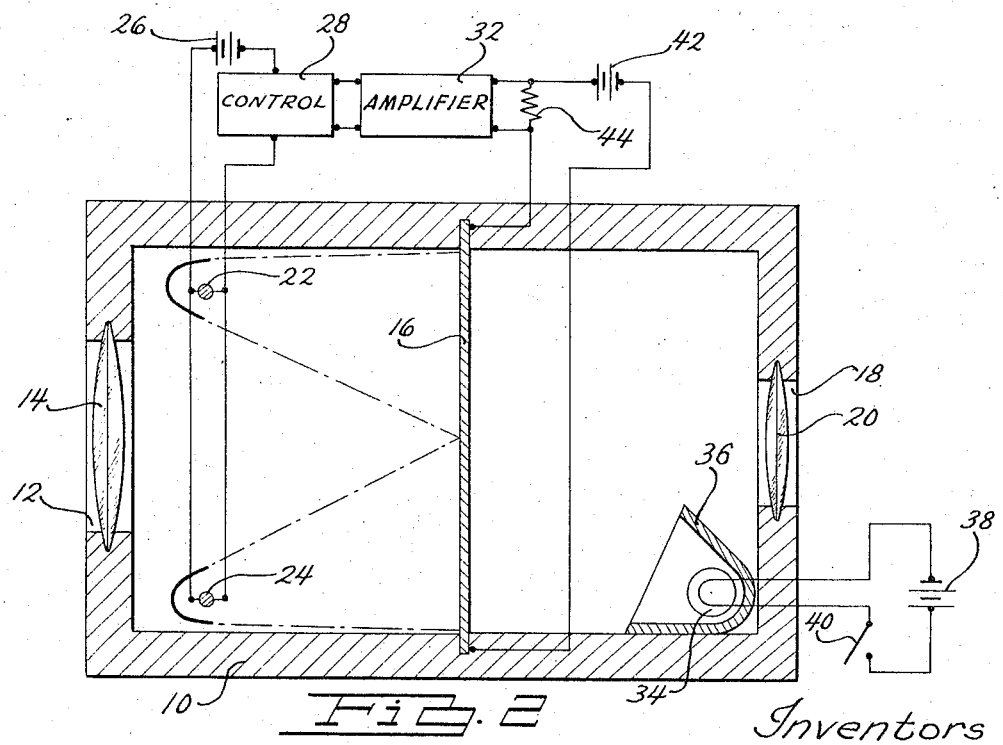

These and other objects, advantages and features will become readily apparent from the following description taken in connection with the illustrative structural embodiment of the accompanying FIGURE 1 which is a simplified schematic representation of an example of an embodiment of the invention, and FIGURE 2 which is a modification of the embodiment of FIGURE 1.

An example of an invisible radiation imaging device, as illustrated in FIGURE 1, consists of a box-like enclosure 10, preferably evacuated and provided with an aperture 12 on one end, in which is placed an objective lens 14. The objective lens 14 is adapted to focus an image of the target, or object to be examined, on a film 16 of thermochromic material. It has been found that thin films of vanadium dioxides having the general formula $VO_2$, prepared as explained in copending patent application Ser. No. 358,065, filed April 7, 1964, exhibit a sudden change of color in the visible spectrum when heated to a predetermined transition temperature. Such a thin film of vanadium dioxide, or similar material, is used as the thermochromic film 16 in the illustrated device according to the invention.

The other end of the enclosure 10 is also provided with an aperture 18 in which is disposed a viewing or ocular lens 20. Heating elements such as radiators 22 and 24 are disposed in the enclosure 10, preferably between the objective lens 14 and the thermochromic film 16, so as to maintain the film at a predetermined temperature in the neighborhood of the transition temperature which is generally in the order of 60 to 70° C. The heating elements 22 and 24 are connected to a source of electricity 26 through a control element 28, which may consist of an "on" and "off" switch or any other appropriate well-known device to control the current flowing through the heating elements 22 and 24. A photo-cell element 30, or the like, is disposed within the enclosure 10 and, by means of an amplifier 32 connected to the control element 28, is adapted to regulate the amount of heat radiated by the heating elements 22–24 in such a way as to maintain the temperature of the film 16 at or near the transition temperature. The amplifier 32 and the control element 28 are adjusted to properly calibrate the system and to vary its sensitivity by heating the thermochromic film 16 to a temperature more or less near the transition temperature. Also, if aging of the thermochromic film causes a change in its properties, this may be compensated for by further adjustment of the amplifier or of the control element.

In operation, the imaging device is aimed at a target and an image of the target is focused by means of the objective lens 14 upon the left hand surface, as seen in the drawing, of the thermochromic film 16. Portions of the surface of the film 16 which are struck by thermal radiation are brought to a temperature beyond the transition temperature and, consequently, experience a change in color. As the film 16 is very thin, its thickness being in the order of .1 micron on a substrate, such local changes in color are observable as a visible image of the invisible thermal image on the right hand side of the film 16, by means of the viewing lens 20. It is obvious that the film 16 may be also observed by viewing the left hand side of the film 16.

An illuminating device, comprising for example an incandescent lamp 34 disposed within a reflector 36 and connected to a source of electricity 38 through a switch 40, may be used to illuminate the thermochromic film 16 for viewing of the image displayed thereon.

The modification which is schematically illustrated in FIGURE 2 is in principle similar to the embodiment of FIGURE 1, but utilizes the variation of resistivity of the thermochromic film 16 to operate the control element 28. Thermochromic materials in general, including vanadium dioxide more specifically, experience a variation of electrical resistivity in function of the temperature of the material. The local variations of resistivity of the thermochromic film 16, due to localized increases of temperature of the portions of the film struck by thermal radiation, cause variations of the total electrical resistance of the film through which flows an electrical current from a source of electricity 42. This in turn causes voltage variations across a resistor 44 in series in the circuit. The voltage variation signal, amplified by amplifier 32, is utilized to regulate the action of the heating elements 22 and 24 by means of control element 28, thus maintaining the thermochromic film 16 at the threshold of the transition temperature.

It can thus be seen that devices according to the invention are thus capable of transforming an invisible radiation image into a directly visible image, by local change of the color of a thermochromic film.

Although the present invention has been shown and described with reference to particular embodiments, various changes and modifications will be obvious to anyone skilled in the art, and such changes and modifications are deemed to be within the spirit, scope and contemplation of the invention as claimed.

What is claimed as new is:

1. An infrared imaging device comprising a vanadium dioxide film, means forming an infrared image on said film, heating means maintaining said film at the threshold of a transition temperature at which the surface of said film exhibits a color change, means responsive to the color condition of said film for controlling said heating means, means illuminating said film, and means for visually observing said film.

2. An infrared imaging device comprising a vanadium dioxide film, means forming an infrared image on said film, heating means normally maintaining said film at the threshold of a transition temperature at which the surface of said film exhibits a color change, means responsive to electrical resistance variations of said film due to resistivity variations of the portions of said film locally heated by said infrared image for controlling said heating means, means illuminating said film, and means for visually observing said film.

References Cited
UNITED STATES PATENTS

| | | | |
|---|---|---|---|
| 2,920,205 | 1/1960 | Choyke | 250—83.3 |
| 2,982,856 | 5/1961 | Camp | 250—83.3 |
| 2,989,636 | 6/1961 | Lieb | 250—83.3 |
| 3,114,836 | 12/1963 | Fergason et al. | 250—83 |

RALPH G. NILSON, *Primary Examiner.*

S. ELBAUM, *Assistant Examiner.*